United States Patent
Yun (10) Patent No.: US 11,555,343 B2
(45) Date of Patent: Jan. 17, 2023

(54) FOUR-BAR LINKAGE APPARATUS FOR PREVENTING SLIDING DOOR FOR VEHICLE FROM SWAYING

(71) Applicants: Hyundai Motor Company, Seoul (KR); Kia Corporation, Seoul (KR)

(72) Inventor: Hyung-In Yun, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 90 days.

(21) Appl. No.: 17/319,769

(22) Filed: May 13, 2021

(65) Prior Publication Data

US 2022/0106822 A1 Apr. 7, 2022

(30) Foreign Application Priority Data

Oct. 7, 2020 (KR) .................. 10-2020-0129535

(51) Int. Cl.
*E05D 15/10* (2006.01)
*B60J 5/04* (2006.01)
*B60J 5/06* (2006.01)

(52) U.S. Cl.
CPC ............ *E05D 15/101* (2013.01); *B60J 5/047* (2013.01); *B60J 5/06* (2013.01); *E05Y 2900/531* (2013.01)

(58) Field of Classification Search
CPC ............ E05D 15/101; E05D 2015/1626; B60J 5/047; B60J 5/06
USPC ....................................................... 296/155
See application file for complete search history.

(56) References Cited

U.S. PATENT DOCUMENTS

| 3,051,999 A * | 9/1962 | Schimek ................. E05D 15/06 16/370 |
| 5,507,119 A * | 4/1996 | Sumiya .................... E05F 15/56 49/218 |
| 5,921,613 A * | 7/1999 | Breunig ..................... B60J 5/06 296/146.12 |
| 6,183,039 B1 * | 2/2001 | Kohut ................. E05D 15/1081 296/146.12 |
| 7,611,190 B1 * | 11/2009 | Elliott ........................ B60J 5/06 49/248 |
| 7,658,438 B1 * | 2/2010 | Elliott ................. E05D 15/1081 296/155 |
| 7,954,880 B2 * | 6/2011 | Kunishima ......... E05D 15/1081 296/146.12 |
| 8,234,816 B2 * | 8/2012 | Heuel ..................... E05D 3/127 49/211 |

(Continued)

FOREIGN PATENT DOCUMENTS

KR 101684536 B1 12/2016

*Primary Examiner* — Jason S Morrow
(74) *Attorney, Agent, or Firm* — Slater Matsil, LLP (57) ABSTRACT

An embodiment apparatus for preventing a sliding door from swaying includes a rail on a vehicle body, an arm bracket attached to a door panel of a door, a slider slidable in a front-rear direction on the rail, a first arm having first and second sides hingedly coupled to the arm bracket and to a first side of the slider, respectively, a second arm having first and second sides hingedly coupled to the arm bracket and to a second side of the slider, respectively, and a latch part on the slider for adjusting rotations of the first and second arms, wherein the first and second arms push the door outward while being spread and deployed during a first stage operation, and the slider slides on the rail to fully open the door during a second stage operation.

20 Claims, 12 Drawing Sheets

(56) References Cited

U.S. PATENT DOCUMENTS

| | | | | |
|---|---|---|---|---|
| 8,353,555 B2* | 1/2013 | Boettcher | ........... | E05D 15/1047 |
| | | | | 296/146.12 |
| 8,469,441 B2* | 6/2013 | Heuel | ................... | E05D 15/101 |
| | | | | 296/146.12 |
| 9,440,519 B2* | 9/2016 | Choi | ..................... | E05D 15/101 |
| 10,443,282 B2* | 10/2019 | Bauer | ................. | E05D 15/1047 |
| 11,365,577 B2* | 6/2022 | Yun | ....................... | E05F 15/652 |
| 11,414,905 B2* | 8/2022 | Yun | ........................ | B60J 5/0468 |
| 11,440,383 B2* | 9/2022 | Yun | ............................ | B60J 5/06 |
| 11,446,992 B2* | 9/2022 | Baik | ........................ | B60J 5/06 |
| 2015/0167370 A1* | 6/2015 | Choi | ................... | E05D 15/1081 |
| | | | | 403/83 |
| 2016/0356069 A1 | 12/2016 | Choi et al. | | |
| 2020/0240186 A1* | 7/2020 | Kuroiwa | ............. | E05D 15/1047 |
| 2022/0120126 A1* | 4/2022 | Yun | ....................... | E05F 15/646 |
| 2022/0185079 A1* | 6/2022 | Sumiya | ................... | E05F 15/63 |
| 2022/0290474 A1* | 9/2022 | Fukahori | ................. | E05D 15/30 |

* cited by examiner

FOUR-BAR LINKAGE APPARATUS FOR PREVENTING SLIDING DOOR FOR VEHICLE FROM SWAYING

CROSS-REFERENCE TO RELATED APPLICATIONS

This application claims the benefit of Korean Patent Application No. 10-2020-0129535, filed on Oct. 7, 2020, in the Korean Intellectual Property Office, which application is hereby incorporated herein by reference.

TECHNICAL FIELD

The present invention relates to a four-bar linkage apparatus for preventing a sliding door for a vehicle from swaying.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

Figure 1:
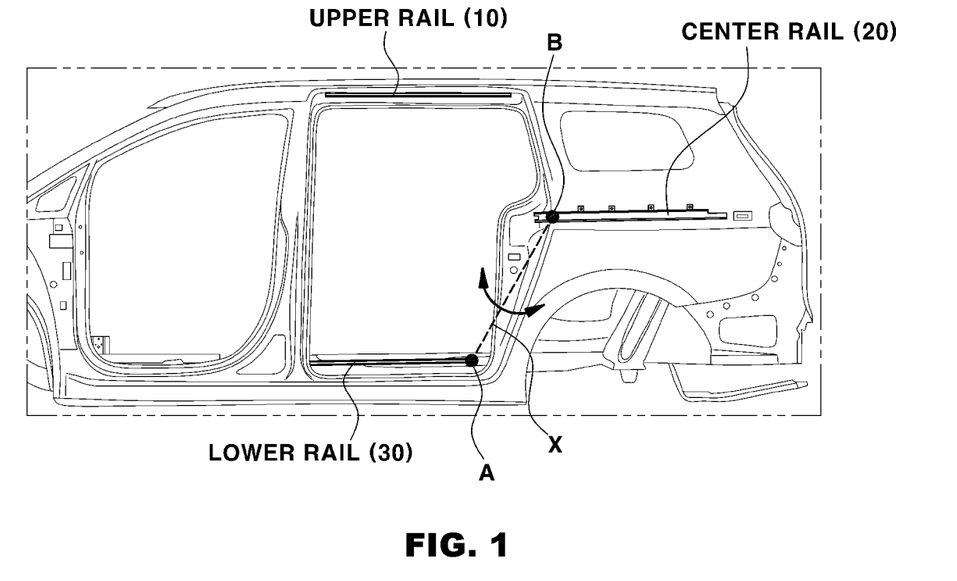
FIG. 1 is a configuration view illustrating a door opened or closed in a sliding manner in the related art.

FIG. 1 is a view illustrating a vehicle body of a vehicle having a door opened or closed in a sliding manner in the related art. The door in the related art, which operates in a sliding manner to open or close an occupant compartment, includes an upper rail 10 configured to support an upper portion of a door 1, when the door 1 slides, in order to ensure a forward/rearward sliding operation of the door 1 coupled to a vehicle body 2, a center rail 20 configured to support a central portion of the door 1 when the door 1 slides, and a lower rail 30 configured to support a lower portion of the door 1 when the door 1 slides.

However, because the rails 10, 20, and 30 for sliding the door 1 and components related to the rails 10, 20, and 30 are installed on the vehicle body, there is concern that a weight of the vehicle and the number of components of the vehicle are increased and a degree of design freedom of the vehicle deteriorates.

Therefore, a 2-rail type door apparatus for a vehicle, in which only center and lower rails support the door so that the door is slidable, has been developed to solve the above-mentioned problems in the related art. As an example of the technology, Korean Patent No. 10-1584536 discloses a sliding door apparatus for a vehicle.

The publicly known technology shows a configuration in which a door rail (center rail) is mounted on a sliding door, and a vehicle body rail is mounted on a vehicle body, such that a center slider coupled to the door rail and a lower slider coupled to the vehicle body rail are moved to open or close the sliding door.

Figure 2:
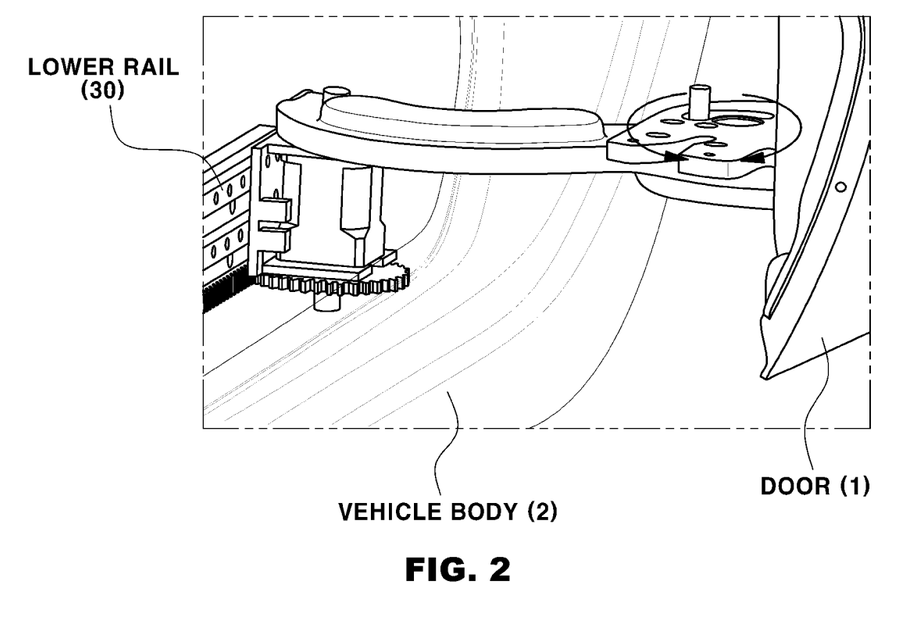
FIG. 2 is a detailed view illustrating the door opened or closed in a sliding manner in the related art.

Referring to FIG. 1, the sliding structure in the related art has two support points at which the sliding door is supported, and the two support points include a contact point A between the vehicle body rail and the lower slider and a contact point B between the center rail and the center slider. However, as illustrated in FIG. 2, there is a problem in that the door 1 sways in a direction indicated by the arrow illustrated in FIG. 2 with respect to an imaginary axis X that connects the two contact points. There is concern that the sway of the door 1 may cause gaps between the door and a door frame when the door is opened or closed, and the sway of the door 1 may degrade marketability of the vehicle.

SUMMARY

The present invention relates to a four-bar linkage apparatus for preventing a sliding door for a vehicle from swaying. Particular embodiments relate to a sway prevention apparatus including a rail installed on a lower portion of a vehicle body, an arm bracket attached to a door panel of a door assembled to the vehicle body, a slider installed to be slidable in a front-rear direction on the rail, a first arm hingedly coupled, at one side thereof, to the arm bracket and hingedly coupled, at the other side thereof, to one side of the slider, a second arm hingedly coupled, at one side thereof, to the arm bracket and hingedly coupled, at the other side thereof, to the other side of the slider, and a latch part installed on the slider and configured to adjust rotations of the first and second arms.

Embodiments of the present invention provide a configuration of an apparatus for preventing a sliding door for a vehicle from swaying, which is capable of preventing a sliding door from swaying, preventing a gap from being formed in the sliding door, and improving a degree of design freedom of a vehicle door frame.

An exemplary embodiment of the present invention provides a four-bar linkage apparatus for preventing a sliding door for a vehicle from swaying, the four-bar linkage apparatus including a rail installed on a lower portion of a vehicle body, an arm bracket attached to a door panel of a door assembled to the vehicle body, a slider installed to be slidable in a front-rear direction on the rail, a first arm hingedly coupled, at one side thereof, to the arm bracket and hingedly coupled, at the other side thereof, to one side of the slider, a second arm hingedly coupled, at one side thereof, to the arm bracket and hingedly coupled, at the other side thereof, to the other side of the slider, and a latch part installed on the slider and configured to adjust rotations of the first and second arms.

The four-bar linkage apparatus for preventing a sliding door for a vehicle from swaying according to embodiments of the present invention, which is configured as described above, does not require an upper rail and a center rail which were installed in a sliding door in the related art. Therefore, the four-bar linkage apparatus may be applied to sliding doors of various vehicles such as sedans, thereby improving a degree of design freedom of the vehicle.

It is also possible to stably open or close the door by preventing the sway of the door, and to prevent the occurrence of gaps between the door and a door frame caused by the sway of the door.

BRIEF DESCRIPTION OF THE DRAWINGS

FIGS. 6A to 6D are detailed views of respective parts of the sway prevention apparatus according to embodiments of the present invention, in which

FIGS. 7A and 7B are views illustrating an operational sequence of the sway prevention apparatus according to embodiments of the present invention, in which

FIGS. 8A to 8C are views illustrating a state in which the sway prevention apparatus according to embodiments of the present invention operates in the first stage, in which

DETAILED DESCRIPTION OF ILLUSTRATIVE EMBODIMENTS

Hereinafter, a configuration and an operation of a four-bar linkage apparatus for preventing a sliding door for a vehicle from swaying according to embodiments of the present invention will be described in detail with reference to the drawings.

However, the disclosed drawings are provided as an example for fully conveying the spirit of the present invention to those skilled in the art. Therefore, the present invention is not limited to the drawings disclosed below and may be specified as other aspects.

Unless otherwise defined, the terminologies used in the specification of the present invention have the meanings that a person with ordinary skill in the art to which the present invention pertains typically understands, and in the following description and the accompanying drawings, a detailed description of publicly known functions and configurations will be omitted so as to avoid unnecessarily obscuring the subject matter of the present invention.

Figure 3:
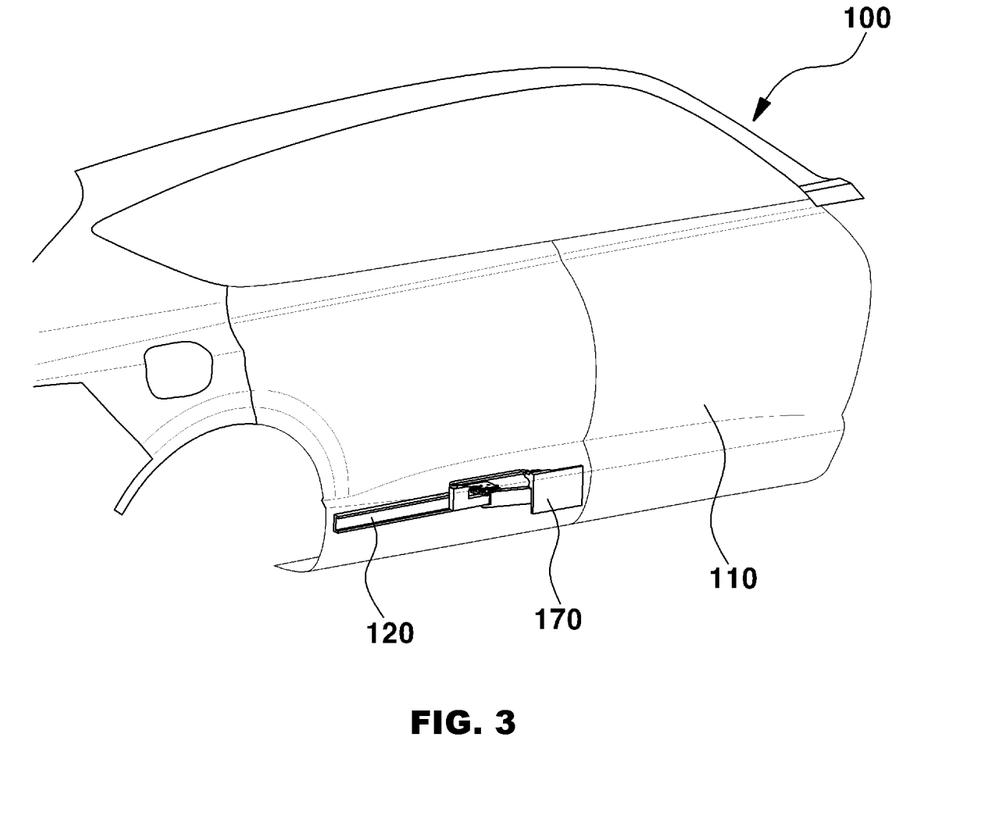
FIG. 3 is a view illustrating a state in which a sway prevention apparatus according to embodiments of the present invention is installed.
Figure 4:
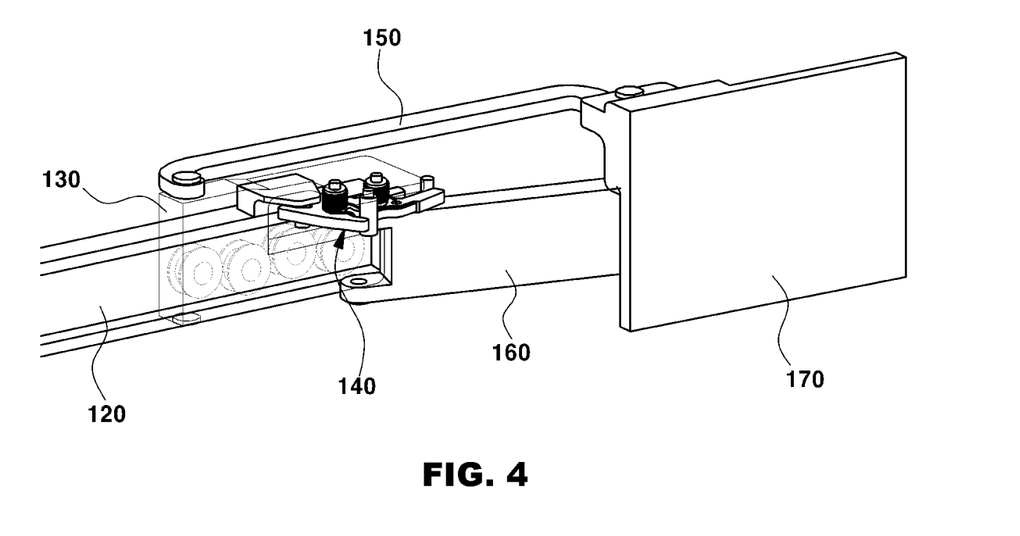
FIG. 4 is a perspective view of the sway prevention apparatus according to embodiments of the present invention.

FIG. 3 is a view illustrating a state in which a sway prevention apparatus according to embodiments of the present invention is installed, and FIG. 4 is a perspective view of the sway prevention apparatus according to embodiments of the present invention.

First, referring to FIG. 3, a four-bar linkage apparatus for preventing a sliding door for a vehicle from swaying (hereinafter, referred to as a 'sway prevention apparatus' for convenience) according to embodiments of the present invention includes a rail 120 installed on a lower portion of a vehicle body 2 of a vehicle, and an arm bracket 170 attached to a door panel 110 of a door 100 assembled to the vehicle body 2.

As illustrated in FIG. 4, a first arm 150 and a second arm 160 are hingedly coupled to the arm bracket 170, the first arm 150 and the second arm 160 are hingedly coupled to a slider 130 configured to slide in a front-rear direction on a channel 123 of the rail 120, and operations of the first and second arms 150 and 160 are adjusted by a latch part 140 installed on the slider 130.

Unlike a configuration of a sliding door in the related art including an upper rail, a center rail, and a lower rail, the sway prevention apparatus according to embodiments of the present invention has only the lower rail without having the upper rail and the center rail, and the sway prevention apparatus has been conceived to eliminate a structural limitation of the sliding door in the related art in which the upper rail and the center rail need to be installed to open or close the sliding door.

Hereinafter, the configuration of the sway prevention apparatus according to embodiments of the present invention will be described in more detail.

Figure 5:
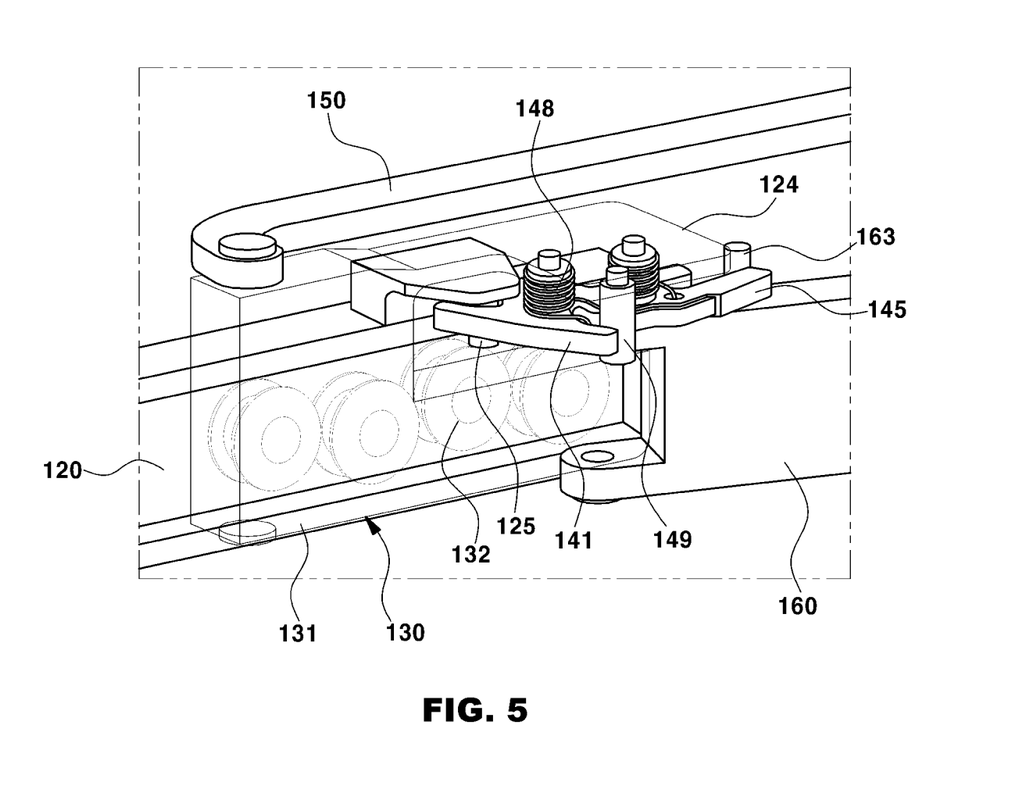
FIG. 5 is a detailed perspective view of the sway prevention apparatus according to embodiments of the present invention.
Figure 6A:
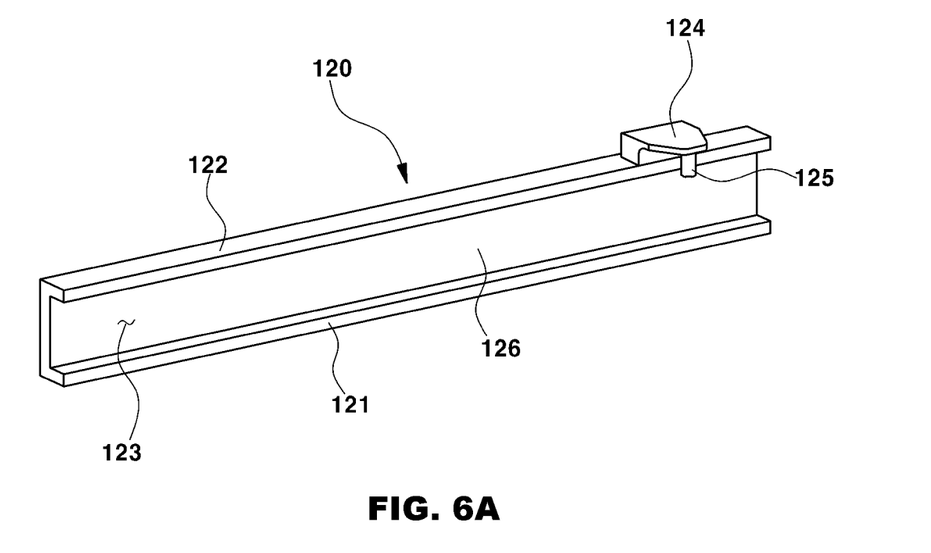
FIG. 6A is a detailed view of a rail.
Figure 6B:
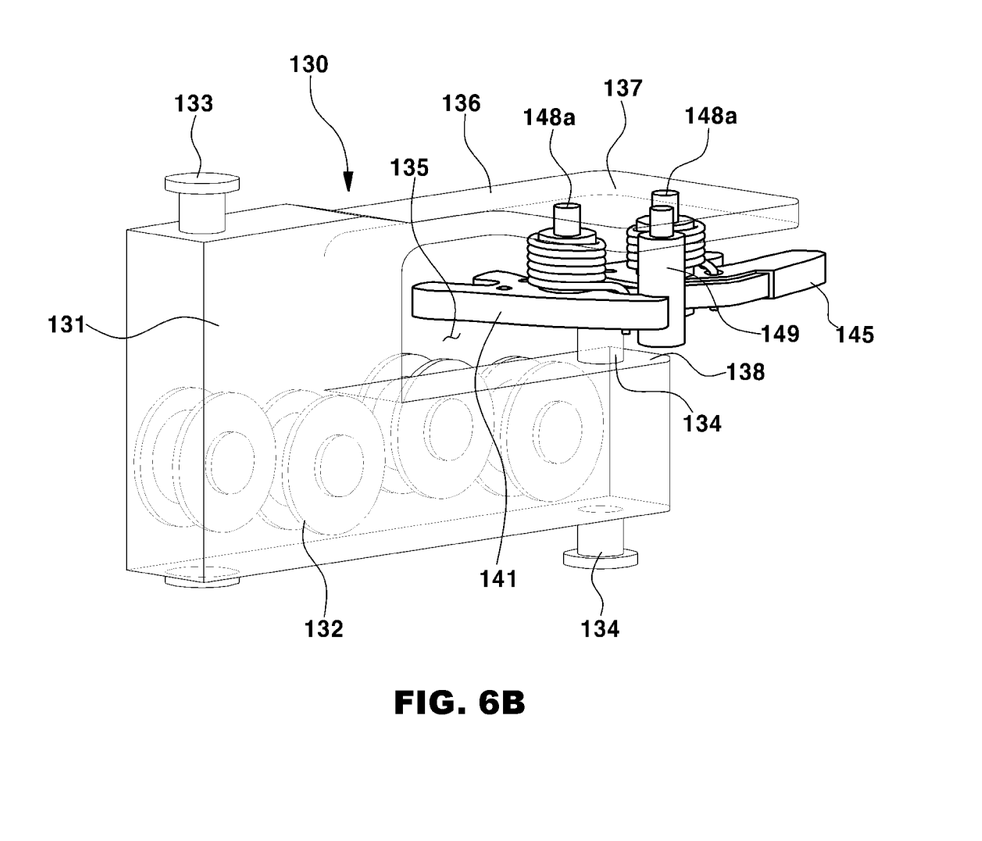
FIG. 6B is a detailed view of a slider.
Figure 6C:
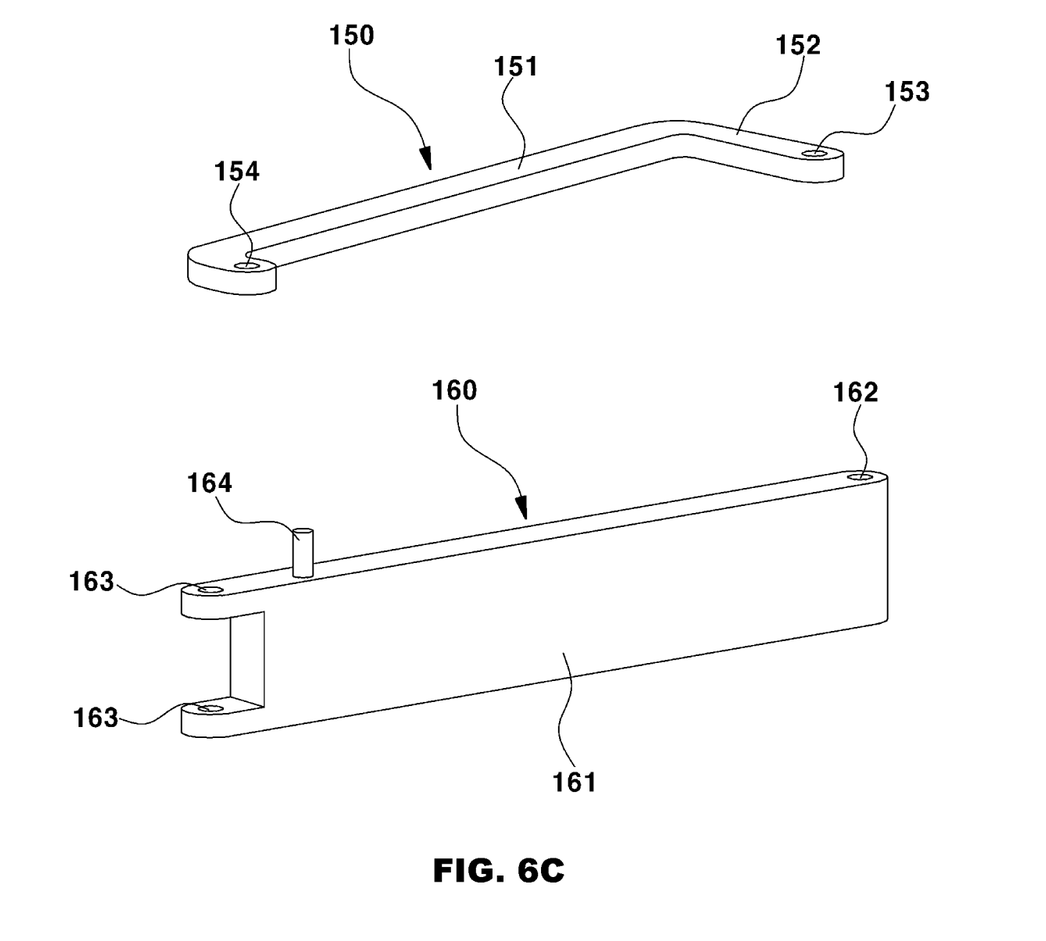
FIG. 6C is detailed views of first and second arms.
Figure 6D:
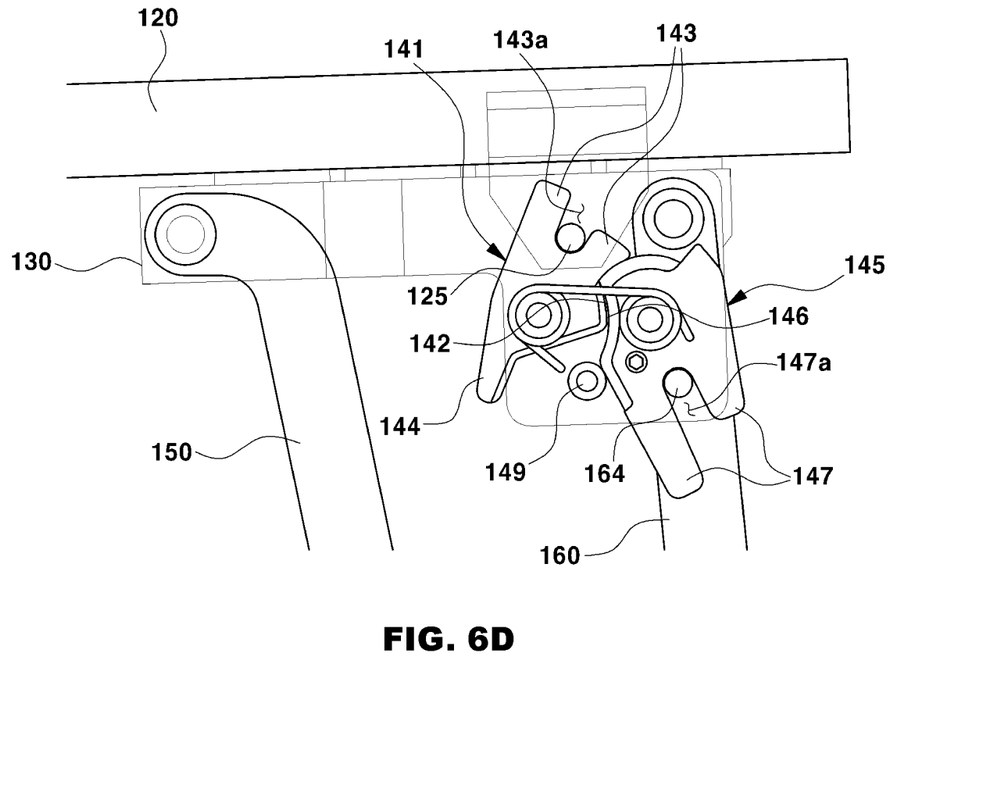
FIG. 6D is a detailed view of a latch part.

FIG. 5 is a detailed perspective view of the latch part of the sway prevention apparatus according to embodiments of the present invention, and FIGS. 6A to 6D are detailed views of respective parts of the sway prevention apparatus according to embodiments of the present invention, in which FIG. 6A is a detailed view of the rail, FIG. 6B is a detailed view of the slider, FIG. 6C is detailed views of the first and second arms, and FIG. 6D is a detailed view of the latch part.

Referring to FIG. 5, the sway prevention apparatus according to embodiments of the present invention includes the rail 120 installed on the lower portion of the vehicle body 2 of the vehicle, the arm bracket 170 attached to the door panel 110 of the door 100 assembled to the vehicle body 2, the slider 130 installed to be slidable in the front-rear direction on the rail 120, the first arm 150 hingedly coupled, at one side thereof, to the arm bracket 170 and hingedly coupled, at the other side thereof, to one side of the slider 130, the second arm 160 hingedly coupled, at one side thereof, to the arm bracket 170 and hingedly coupled, at the other side thereof, to the other side of the slider 130, and the latch part 140 installed on the slider 130 and configured to adjust rotations of the first and second arms 150 and 160.

The slider 130 has bearings 132 embedded in a box-shaped housing 131 so that the slider 130 may slide on the channel 123 of the rail 120.

The latch part 140 includes first and second catching members 141 and 145 in order to adjust the rotations of the first and second arms 150 and 160, and has a structure for restricting the movement of the slider 130 and the rotation of the second arm 160.

Next, referring to FIG. 6A, the rail 120 has a body having a flat plate shape as a member attached to the lower portion of the vehicle body 2, lower and upper surfaces 121 and 122 of the body are bent from a bottom surface 126, and the channel 123 on which the slider 130 slides is defined in a space between the lower surface 121 and the upper surface 122.

A boss 124, which protrudes upward, is formed at one end of the rail 120. A rail striker 125 is formed downward from a bottom surface of the boss 124 and inserted into a projection inner hole 143a formed between insertion projections 143 of the first catching member 141 of the latch part 140 in order to control a rotation of the first catching member 141.

Next, referring to FIG. 6B, the slider 130 has the box-shaped housing 131, and the bearings 132 are embedded in the housing 131 so that the slider 130 may slide on the channel 123 of the rail 120. An insertion protrusion 133 is formed on an upper surface at one side of the housing 131, and a pair of internal insertion protrusions 134 is formed on upper and lower surfaces at the other side of the housing 131, respectively. A long hole 135, which has an extension surface 136 at an upper side thereof and a stepped projection 138 at a lower side thereof, is formed at one side of the housing 131. The boss 124 of the rail 120 and the latch part 140 are positioned in an internal space of the long hole 135. A flange 137, which protrudes in a direction of the arm bracket 170, is formed integrally with the extension surface 136, and the latch part 140 is coupled to a lower portion of the flange 137.

Referring to FIG. 6C, the first arm 150 includes a center bar 151 extending in a longitudinal direction thereof, and a connecting bar 152 extending by being bent perpendicular to one side of the center bar 151. A coupling hole 153 is formed at an end of the connecting bar 152, an insertion hole 154 is formed at the other side of the center bar 151, and the insertion protrusion 133 of the slider 130 is inserted into the insertion hole 154.

Next, the second arm 160 includes a body 161 having a flat plate shape, and an entrance hole 162 is formed at one side of the body 161. Internal insertion holes 163 are formed at the other side of the body 161, and the pair of internal insertion protrusions 134 of the slider 130 is inserted into the internal insertion holes 163, respectively. An arm striker 164, which protrudes upward, is formed on an upper surface of the body 161.

The arm bracket 170 is a member attached to the door panel 11o of the door 100 and includes a first arm hinge member 171 hingedly coupled to the coupling hole 153 of the first arm 15o, and a second arm hinge member 172 hingedly coupled to the entrance hole 162 of the second arm 160. FIG. 8B illustrates the configuration of the first and second arm hinge members 171 and 172 of the arm bracket 170.

Referring to FIG. 6D, the latch part 140 according to embodiments of the present invention includes the first catching member 141 configured to control the movement of the slider 130, and the second catching member 145 configured to control the rotation of the second arm 16o. The latch part 140 is coupled to the lower portion of the flange 137 of the slider 130.

The latch part 140 has protrusions 148a (see FIG. 6B) that penetrate a body of the first catching member 141 and a body of the second catching member 145 and have springs 148 (see FIG. 5) interposed between the protrusions 148a and the bodies of the first and second catching members 141 and 145. The first catching member 141 has, at one side thereof, a meshing surface 142 which is in surface contact with the second catching member 145, and has, at an upper side thereof, the pair of insertion projections 143. The projection inner hole 143a into which the rail striker 125 of the rail 120 is inserted is formed between the insertion projections 143. The first catching member 141 has a catching projection 144 extending from lower portions of the insertion projections 143.

The second catching member 145 has, at one side thereof, an engagement surface 146 which is in surface contact with the first catching member 141, and has, at a lower side thereof, a pair of internal insertion projections 147. An internal insertion projection inner hole 147a into which the arm striker 164 of the second arm 16o is inserted is formed between the internal insertion projections 147.

Meanwhile, the latch part 140 has a column-shaped stopper 149 vertically extending to the lower portion of the flange 137 protruding outward from the extension surface 136 of the slider 130. When the door 100 is in a closed state, the catching projection 144 of the first catching member 141 is caught by the stopper 149, thereby preventing the first catching member 141 from being rotated any further. When the door 100 is in an opened state, a part of the engagement surface 146 of the second catching member 141 is caught by the stopper 149, thereby preventing the second catching member 145 from being rotated any further.

Since the springs 148 provide elastic force to the first catching member 141 and the second catching member 145, the operation of rotating and returning the catching members 141 and 145 is automatically performed by the elastic force in accordance with the opened or closed state of the door 100.

Next, the operation of the sway prevention apparatus according to embodiments of the present invention configured as described above will be described.

Figure 7A:
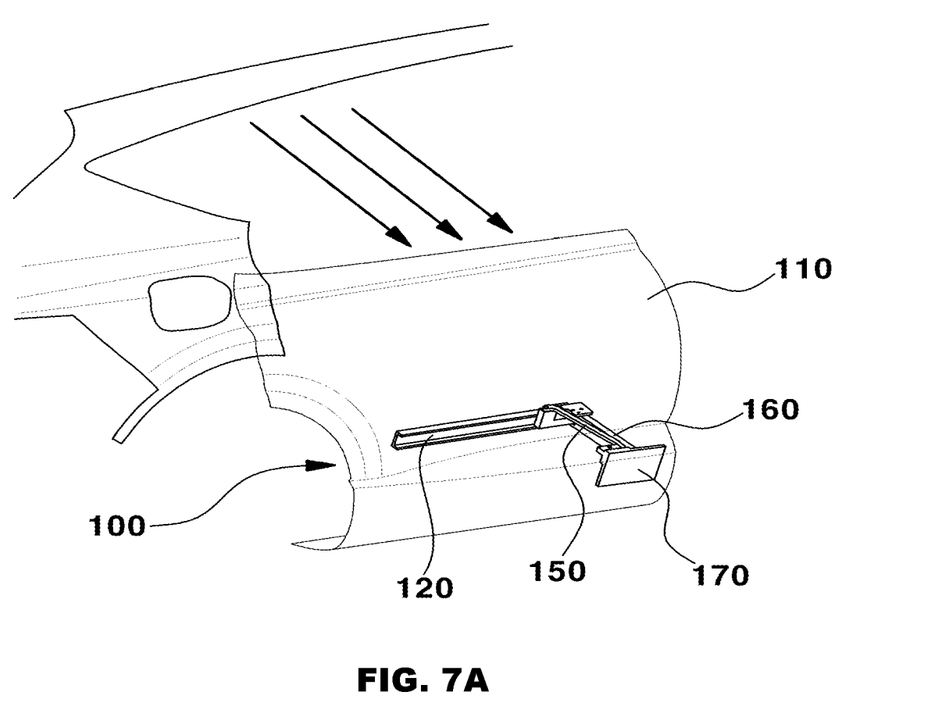
FIG. 7A is a view illustrating a state in which the sway prevention apparatus operates in a first stage.
Figure 7B:
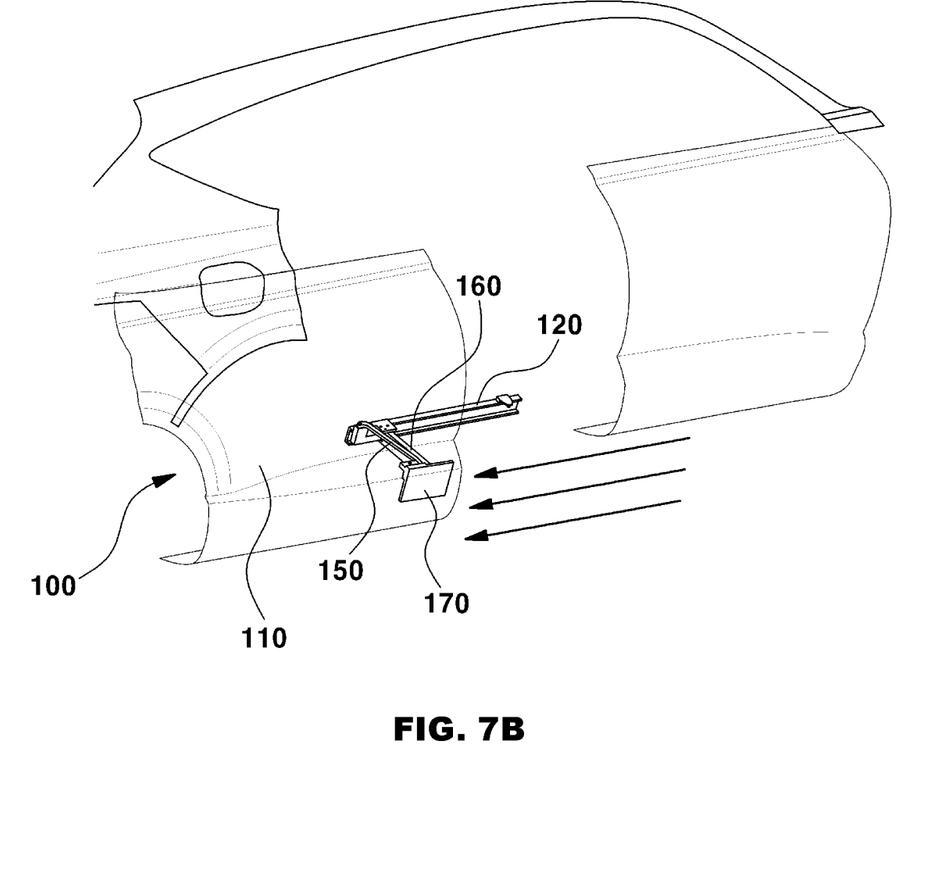
FIG. 7B is a view illustrating a state in which the sway prevention apparatus operates in a second stage.

FIGS. 7A and 7B are views illustrating an operational sequence of the sway prevention apparatus according to embodiments of the present invention, in which FIG. 7A is a view illustrating a state in which the sway prevention apparatus operates in a first stage, and FIG. 7B is a view illustrating a state in which the sway prevention apparatus operates in a second stage.

First, the sway prevention apparatus according to embodiments of the present invention performs a first stage operation, as illustrated in FIG. 7A, in which the first and second arms 150 and 16o, which are hingedly coupled to the slider 130 that slides on the rail 120 installed on the vehicle body 2 when the door 100 is opened, push the door 100 toward the outside of the vehicle body 2 while being spread and deployed, and a second stage operation, as illustrated in FIG. 7B, in which the slider 130 slides on the rail 120 to fully open the door 100 by moving the door 100 pushed toward the outside of the vehicle body 2.

Figure 8A:
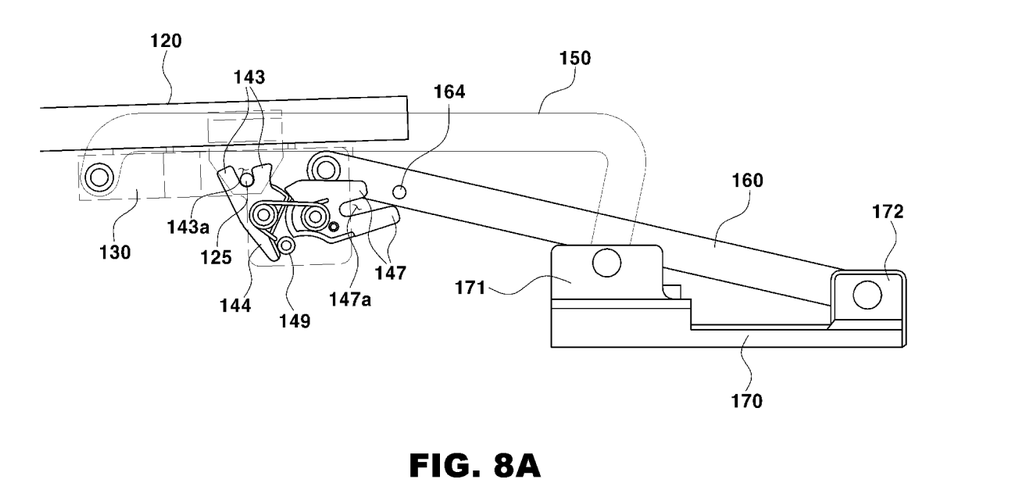
FIG. 8A is a top plan view illustrating a door closed state.
Figure 8B:
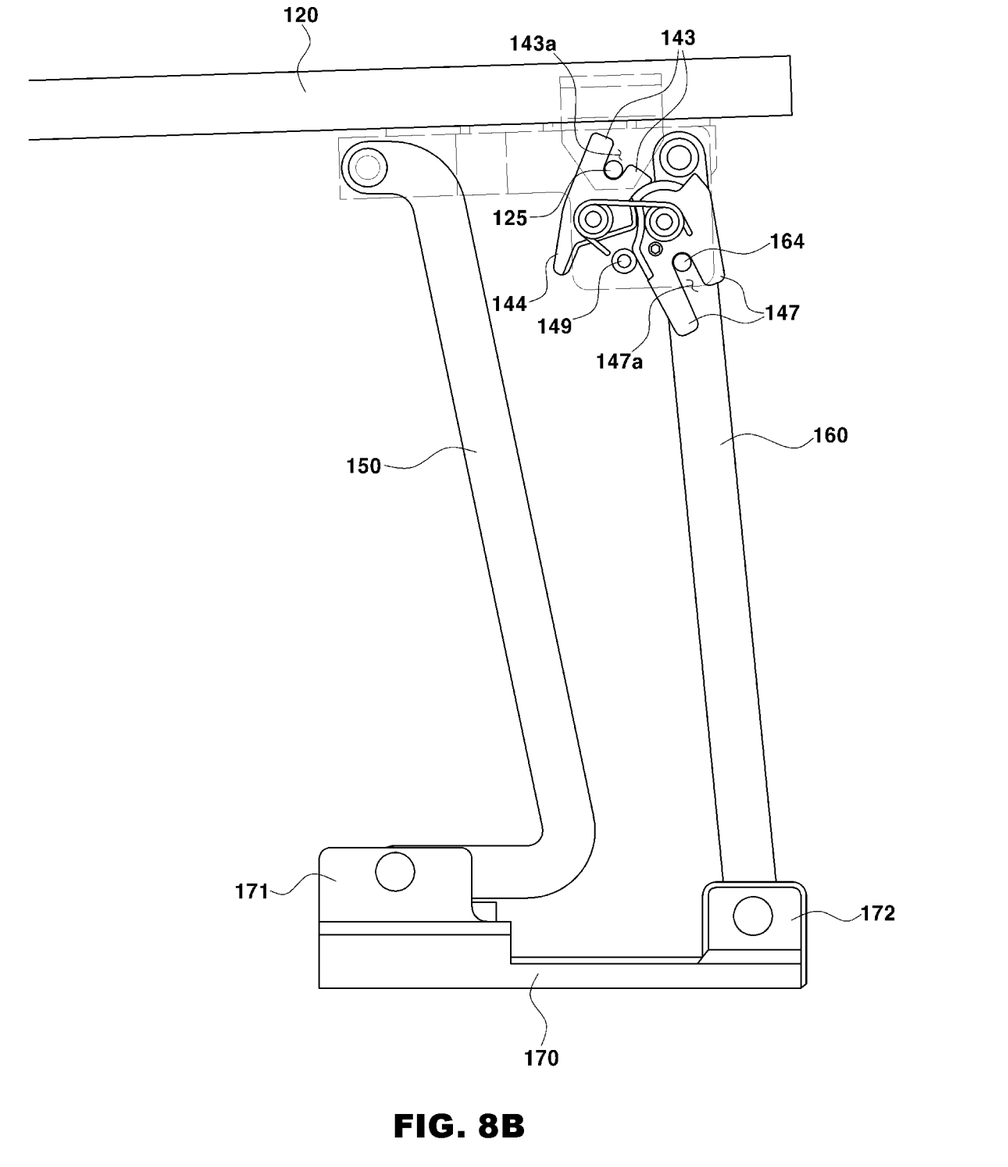
FIG. 8B is a top plan view illustrating a door opened state.
Figure 8C:
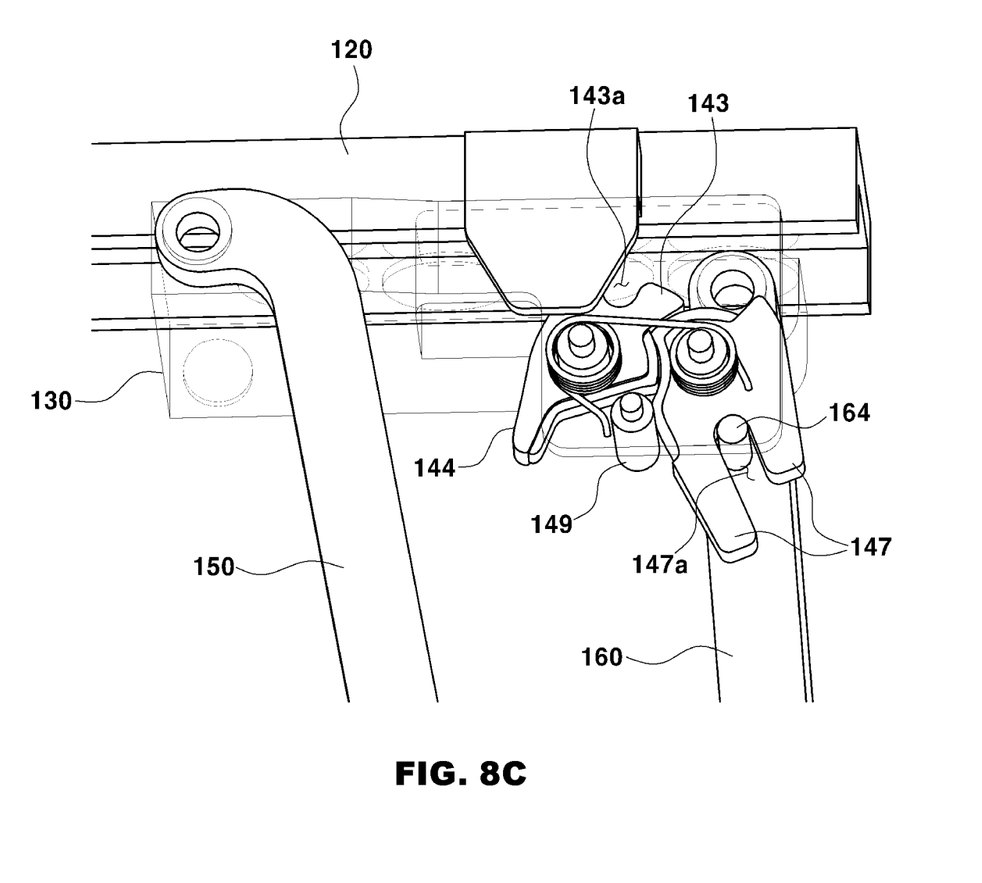
FIG. 8C is a detailed view of the latch part.

FIGS. 8A to 8C are views illustrating a state in which the sway prevention apparatus according to embodiments of the present invention operates in the first stage, in which FIG. 8A is a top plan view illustrating a door closed state, FIG. 8B is a top plan view illustrating a door opened state, and FIG. 8C is a detailed perspective view of the latch part in the door opened state.

First, as illustrated in FIG. 8A, the rail striker 125 installed on the rail 120 is caught by the projection inner hole 143a between the insertion projections 143 of the first catching member 141 of the latch part 140 in the closed state of the door 100, such that the slider 130 is in a locking state in which the slider 130 coupled to the latch part 140 does not slide.

As illustrated in FIGS. 8B and 8C, when the door 100 is opened in this state, the first arm 150 and the second arm 160 are spread and deployed, such that the second catching member 145 of the latch part 140 is rotated, and the first catching member 141, which has the meshing surface 142 in contact with the engagement surface 146, is also rotated along with the rotation of the second catching member 145. The arm striker 164 of the second arm 160 is inserted into the internal insertion projection inner hole 147a between the internal insertion projections 147 of the second catching member 145 by the rotation of the second catching member 145, such that the second catching member 145 is not rotated any further. Therefore, the deployment of the second arm 160 is also stopped. However, as the first catching member 141 is rotated, the rail striker 125, which is caught by the projection inner hole 143a between the insertion projections 143 of the first catching member 141, escapes from the projection inner hole 143a, such that the slider 130 coupled to the latch part 140 may slide and thus the slider 130 is unlocked.

Figure 9:
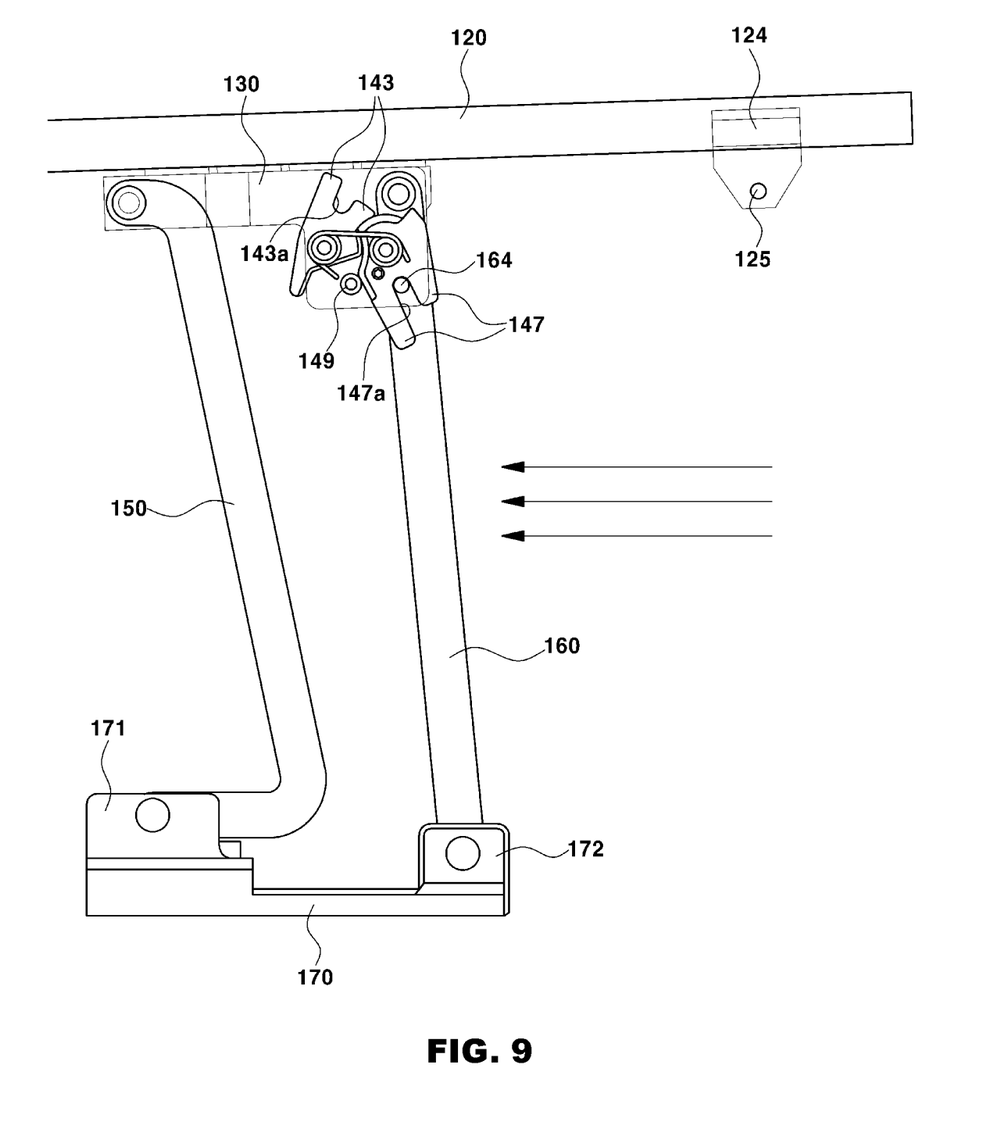
FIG. 9 is a view illustrating a state in which the sway prevention apparatus according to embodiments of the present invention operates in the second stage, that is, a top plan view illustrating a state in which a door moves in the door opened state.

FIG. 9 is a view illustrating a state in which the sway prevention apparatus according to embodiments of the present invention operates in the second stage. When the door 100 is moved rearward or forward in the door opened state as illustrated in FIGS. 8B and 8C, the slider 130 supports the movement of the door 100 while sliding on the channel 123 of the rail 120 along with the movement of the door 100 without additionally rotating the first and second catching members 141 and 145 of the latch part 140 because the slider 130 is in the unlocked state. Then, when the door 100 is fully opened, the slider 130 stops sliding.

Therefore, the sway prevention apparatus according to embodiments of the present invention which operates as described above can stably open or close the door 100 by preventing the sway of the door 100, and prevent the occurrence of gaps between the door and a door frame caused by the sway of the door.

Meanwhile, an operation of closing the door 100 according to embodiments of the present invention is performed in the reverse order to the operation of opening the door 100.

What is claimed is:

1. An apparatus for preventing a sliding door for a vehicle from swaying, the apparatus comprising:
a rail installed on a lower portion of a vehicle body;
an arm bracket attached to a door panel of a door configured to be assembled to the vehicle body;
a slider installed to be slidable in a front-rear direction on the rail;
a first arm hingedly coupled at a first side to the arm bracket and hingedly coupled at a second side to a first side of the slider;
a second arm hingedly coupled at a first side to the arm bracket and hingedly coupled at a second side to a second side of the slider; and
a latch part installed on the slider and configured to adjust rotations of the first arm and the second arm;
wherein the first arm and the second arm, which are hingedly coupled to the slider that is configured to slide when the door is opened, are configured to push the door toward an outside of the vehicle body while being spread and deployed during a first stage operation of opening the door; and
wherein the slider is configured to slide on the rail to fully open the door by moving the door pushed toward the outside of the vehicle body during a second stage operation of opening the door.

2. The apparatus of claim 1, wherein the rail comprises:
a boss formed at a first end of the rail and having a shape protruding upward; and
a rail striker formed downward from a bottom surface of the boss.

3. The apparatus of claim 1, wherein:
the slider has a box-shaped housing;
an insertion protrusion is formed on an upper surface at a first side of the housing, and a pair of internal insertion protrusions is formed on upper and lower surfaces, respectively, at a second side of the housing;
a long hole having an extension surface at an upper side thereof and a stepped projection at a lower side thereof is formed at the first side of the housing; and
a flange protruding in a direction of the arm bracket is formed integrally with the extension surface, and the latch part is coupled to a lower portion of the flange.

4. The apparatus of claim 3, wherein the first arm comprises:
a center bar;
a connecting bar extending by being bent perpendicular at a first side of the center bar and having a coupling hole at an end thereof; and
an insertion hole at a second side of the center bar, wherein the insertion protrusion of the slider is inserted into the insertion hole.

5. The apparatus of claim 3, wherein the second arm comprises:
a body having a flat plate shape;
an entrance hole at a first side of the body;
internal insertion holes at a second side of the body, wherein the pair of internal insertion protrusions of the slider is inserted into the internal insertion holes; and
an arm striker on an upper surface of the body, wherein the arm striker protrudes upward.

6. The apparatus of claim 1, wherein:
the slider is configured to support movement of the door while sliding on a channel of the rail when the door is moved rearward or forward; and
the slider is configured to stop sliding when the door is in a fully opened state.

7. An apparatus for preventing a sliding door for a vehicle from swaying, the apparatus comprising:
a rail installed on a lower portion of a vehicle body;
an arm bracket attached to a door panel of a door configured to be assembled to the vehicle body;
a slider installed to be slidable in a front-rear direction on the rail;
a first arm hingedly coupled at a first side to the arm bracket and hingedly coupled at a second side to a first side of the slider;
a second arm hingedly coupled at a first side to the arm bracket and hingedly coupled at a second side to a second side of the slider; and
a latch part installed on the slider and configured to adjust rotations of the first arm and the second arm, the latch part comprising:
a first catching member configured to control a movement of the slider; and
a second catching member configured to control a rotation of the second arm;
wherein the first arm and the second arm, which are hingedly coupled to the slider that is configured to slide when the door is opened, are configured to push the door toward an outside of the vehicle body while being spread and deployed during a first stage operation of opening the door; and
wherein the slider is configured to slide on the rail to fully open the door by moving the door pushed toward the outside of the vehicle body during a second stage operation of opening the door.

8. The apparatus of claim 7, wherein the latch part further comprises protrusions configured to penetrate a body of the first catching member and a body of the second catching member and having springs interposed between the protrusions and the bodies of the first and second catching members.

9. The apparatus of claim 8, wherein the first catching member includes:
a meshing surface at a first side of the first catching member in surface contact with the second catching member;
a pair of insertion projections at an upper side of the first catching member;
a projection inner hole between the pair of insertion projections, wherein a rail striker of the rail is inserted in the projection inner hole; and a catching projection extending from lower portions of the pair of insertion projections.

10. The apparatus of claim 7, wherein the second catching member includes:
an engagement surface at a first side of the second catching member in surface contact with the first catching member;
a pair of internal insertion projections at a lower side of the second catching member; and
an internal insertion projection inner hole between the pair of internal insertion projections, wherein an arm striker of the second arm is inserted in the internal insertion projection inner hole.

11. The apparatus of claim 10, further comprising a stopper vertically extending to a lower portion of a flange protruding outward from an extension surface of the slider.

12. The apparatus of claim 11, wherein:
the second catching member is configured to be rotated when the first arm and the second arm are spread and deployed, and the first catching member is configured to be rotated along with the rotation of the second catching member;
the arm striker of the second arm is configured to be inserted into the internal insertion projection inner hole by the rotation of the second catching member, such that the second catching member is not rotated any further; and
a rail striker, which is caught by a projection inner hole between a pair of insertion projections of the first catching member, is configured to escape from the projection inner hole as the first catching member is rotated, such that the slider coupled to the latch part is slidable and the slider is unlocked.

13. A vehicle comprising:
a vehicle body;
a door coupled to the vehicle body, the door including a door panel;
a rail installed on a lower portion of the vehicle body;
an arm bracket attached to the door panel;
a slider installed to be slidable in a front-rear direction of the vehicle on the rail;
a first arm hingedly coupled at a first side to the arm bracket and hingedly coupled at a second side to a first side of the slider;
a second arm hingedly coupled at a first side to the arm bracket and hingedly coupled at a second side to a second side of the slider; and
a latch part installed on the slider and configured to adjust rotations of the first arm and the second arm;
wherein the first arm and the second arm, which are hingedly coupled to the slider that is configured to slide when the door is opened, are configured to push the door toward an outside of the vehicle body while being spread and deployed during a first stage operation of opening the door; and
wherein the slider is configured to slide on the rail to fully open the door by moving the door pushed toward the outside of the vehicle body during a second stage operation of opening the door.

14. The vehicle of claim 13, wherein the rail comprises:
a boss formed at a first end of the rail and having a shape protruding upward; and
a rail striker formed downward from a bottom surface of the boss.

15. The vehicle of claim 13, wherein:
the slider has a box-shaped housing;
an insertion protrusion is formed on an upper surface at a first side of the housing, and a pair of internal insertion protrusions is formed on upper and lower surfaces, respectively, at a second side of the housing;
a long hole having an extension surface at an upper side thereof and a stepped projection at a lower side thereof is formed at the first side of the housing; and
a flange protruding in a direction of the arm bracket is formed integrally with the extension surface, and the latch part is coupled to a lower portion of the flange.

16. The vehicle of claim 15, wherein the first arm comprises:
a center bar;
a connecting bar extending by being bent perpendicular at a first side of the center bar and having a coupling hole at an end thereof; and
an insertion hole at a second side of the center bar, wherein the insertion protrusion of the slider is inserted into the insertion hole.

17. The vehicle of claim 15, wherein the second arm comprises:
a body having a flat plate shape;
an entrance hole at a first side of the body;
internal insertion holes at a second side of the body, wherein the pair of internal insertion protrusions of the slider is inserted into the internal insertion holes; and
an arm striker on an upper surface of the body, wherein the arm striker protrudes upward.

18. The vehicle of claim 13, wherein:
the slider is configured to support movement of the door while sliding on a channel of the rail when the door is moved rearward or forward; and
the slider is configured to stop sliding when the door is in a fully opened state.

19. The vehicle of claim 18, wherein the latch part comprises:
a first catching member configured to control a movement of the slider;
a second catching member configured to control a rotation of the second arm;
protrusions configured to penetrate a body of the first catching member and a body of the second catching member; and
springs interposed between the protrusions and the bodies of the first and second catching members.

20. The vehicle of claim 19, wherein the first catching member includes:
a meshing surface at a first side of the first catching member in surface contact with the second catching member;
a pair of insertion projections at an upper side of the first catching member;
a projection inner hole between the pair of insertion projections, wherein a rail striker of the rail is inserted in the projection inner hole; and
a catching projection extending from lower portions of the pair of insertion projections.

* * * * *